(12) United States Patent
Potter et al.

(10) Patent No.: US 10,353,443 B2
(45) Date of Patent: *Jul. 16, 2019

(54) STORAGE DRIVE CARRIER MODULE

(71) Applicant: Hewlett Packard Enterprise Development LP, Houston, TX (US)

(72) Inventors: Andrew Potter, Houston, TX (US); Michael S. Bunker, Tomball, TX (US); Timothy A. McCree, Spring, TX (US); Stephen Spencer, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,883

(22) Filed: Mar. 13, 2018

(65) Prior Publication Data
US 2018/0203489 A1   Jul. 19, 2018

Related U.S. Application Data

(63) Continuation of application No. 15/527,460, filed as application No. PCT/US2014/067617 on Nov. 26, 2014, now Pat. No. 9,927,851.

(51) Int. Cl.
| | |
|---|---|
| *H05K 5/00* | (2006.01) |
| *H05K 7/00* | (2006.01) |
| *G06F 1/18* | (2006.01) |
| *G11B 33/12* | (2006.01) |

(52) U.S. Cl.
CPC .............. *G06F 1/187* (2013.01); *G06F 1/183* (2013.01); *G11B 33/126* (2013.01)

(58) Field of Classification Search
CPC ........................................................ G06F 1/16
See application file for complete search history.

(56) References Cited

U.S. PATENT DOCUMENTS

| | | |
|---|---|---|
| 6,785,133 B2 | 8/2004 | Barringer |
| 6,854,174 B2 | 2/2005 | Jiang |
| 6,873,524 B2 | 3/2005 | Kaczeus, Sr. |
| 6,912,132 B2 | 6/2005 | Riddiford |

(Continued)

FOREIGN PATENT DOCUMENTS

CN      103327656      9/2013

OTHER PUBLICATIONS

Addonics Technologies, "2.5" M2 (NGFF) SSD Drive.", Retrieved Sep. 5, 2014, 2 Pages, http://www.addonics.com/products/ad25m2ssd.php.

*Primary Examiner* — Jerry Wu
(74) *Attorney, Agent, or Firm* — Hewlett Packard Enterprise Patent Department

(57) ABSTRACT

An example carrier module may include a carrier board. The carrier board may include a storage drive interface and an adapter connector in electrical communication with the storage drive interface. The adapter connector may engage with a complementary adapter receiver. The adapter connector may include a plurality of signal pins, at least one ground pin that is longer than the signal pins, and at least one power pin that is longer than the signal pins. The plurality of signal pins, the at least one ground pin, and the at least one power pin may engage with the adapter receiver to facilitate electrical communication between the adapter receiver and the adapter connector.

19 Claims, 6 Drawing Sheets

(56) References Cited

U.S. PATENT DOCUMENTS

| | | | |
|---|---|---|---|
| 8,435,072 B2* | 5/2013 | Mo | H04B 1/3816 361/814 |
| 8,446,729 B2 | 5/2013 | Schuette | |
| 8,717,753 B2 | 5/2014 | Keffeler | |
| 8,725,946 B2 | 5/2014 | Petersen | |
| 2002/0080541 A1* | 6/2002 | Bunker | G06F 1/184 361/72 |
| 2008/0212273 A1 | 9/2008 | Bechtolsheim | |
| 2011/0069441 A1 | 3/2011 | Killen | |
| 2011/0153903 A1 | 6/2011 | Hinkle | |
| 2012/0033370 A1* | 2/2012 | Reinke | G06F 1/185 361/679.4 |

* cited by examiner

STORAGE DRIVE CARRIER MODULE

PRIORITY INFORMATION

This application is a continuation of U.S. application Ser. No. 15/527,460 filed on May 17, 2017, which claims priority to International Application No. PCT/US2014/067617 filed on Nov. 26, 2014. The entire contents of which are incorporated herein by reference.

BACKGROUND

Storage drives can be used to store data from computer systems, including server systems. Further, storage drives can be used to transfer data between multiple computer systems. Storage drives may be easily installed or removed from computer systems, or storage drives may also be installed in the computer system internally, making removal and installation more difficult.

Server systems generally use storage drives as part of a storage array. Server storage drives can be removable from the array without needing to shut down the server system. Such storage drives are generally removed from the front of the server system and can be coupled to a storage adapter in order to facilitate easy removal and installation of the storage drive while the server system is running.

DETAILED DESCRIPTION

Figure 1A:
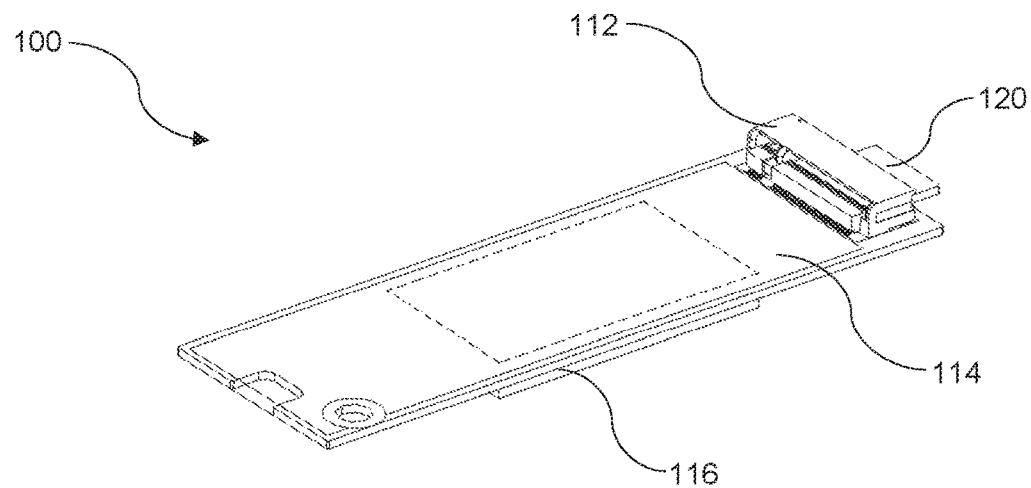
FIG. 1A is a perspective view of an example carrier module including a carrier board, a storage drive interface, an adapter connector, and a power storage component.

Storage drives can have edge connectors that connect the storage drive to a receiving connector in an associated computing system, including a server system. The edge connectors can include multiple pins (e.g., a gold finger connector). The edge connector can include multiple signal pins, at least one ground pin, and at least one power pin. The multiple signal pins communicate a signal to and from a memory portion of the storage drive and the receiving connector, while the at least one ground pin connects the storage drive to ground, and the at least one power pin provides power to the storage drive from the receiving connector. The ground and power pins may be longer than the signal pins.

Storage drives can be coupled to carrier modules to facilitate the use of the storage drive in the computing system. The carrier module may receive the storage drive and may also facilitate the connection between the edge connector of the storage drive and the receiving connector. Server systems can have multiple storage drives, each drive being separately accessible from the front of the server, and each drive having the ability to be removably connected to the system without the function of the system being stopped each drive can be hot plugged).

The ability to hot plug a storage drive into the server system depends on the storage drive being directly insertable into the server system from the front, such that the longer ground and power pins on the storage drive's edge connector can interface with the server system's receiving connector before the signal pins on the edge connector interface with the receiving connector. This allows the storage drive to be in electrical communication with both a ground connection and a power connection before the storage drive begins to receive a signal from the server system through the signal pins.

Some storage drives cannot be directly inserted into the front of a computer system such that the ground and power pins of the storage drive's edge connector interface with the computer system's receiving connector before the signal pins, or, the edge connector on some storage drives do not have ground and power pins that are longer than the signal pins. Such storage drives are precluded from being hot plugged for these reasons. An example of one such drive is a Next Generation Form Factor (NGFF) solid state storage drive. The NGFF storage drive may only have an edge connector that includes ground and power pins that are not longer than the signal pins. Further, NGFF storage drives may only be inserted at an angle relative to a plane defined by the storage drive, the angled insertion precluding the NGFF storage drive from being directly inserted into a receiving connector. Therefore, the NGFF storage drive is not ordinarily hot pluggable.

In contrast, implementations of the present disclosure can provide a carrier module that includes a connector portion having ground and power pins that are longer than the signal pins, and also facilitates the direct insertion of the connector portion of the carrier module into a receiving connector, such that the carrier module allows a non-hot pluggable storage drive to be hot plugged into a computer system, including a server system.

Additionally, storage drives may experience a loss of data that is stored in a memory portion of the storage drive if the at least one power pin of the edge connector of the storage drive experiences a loss of a power input from the receiving connector or the associated computer system.

In contrast, implementations of the present disclosure can provide a carrier module that includes a power storage component in addition to a connector portion. The power storage component can store a power input received by the connector portion from the receiving connector of the associated computer system. If the at least one power pin of the edge connector of a storage drive coupled to the carrier module experiences a loss of a power input from the receiving connector or the associated computer system, then the power storage component of the carrier module can provide a power input to the storage drive that the power storage component previously received from the receiving connector of the associated computer system such that the power storage component supports a storage drive function so that the storage drive does not experience a loss of data.

Figure 1B:
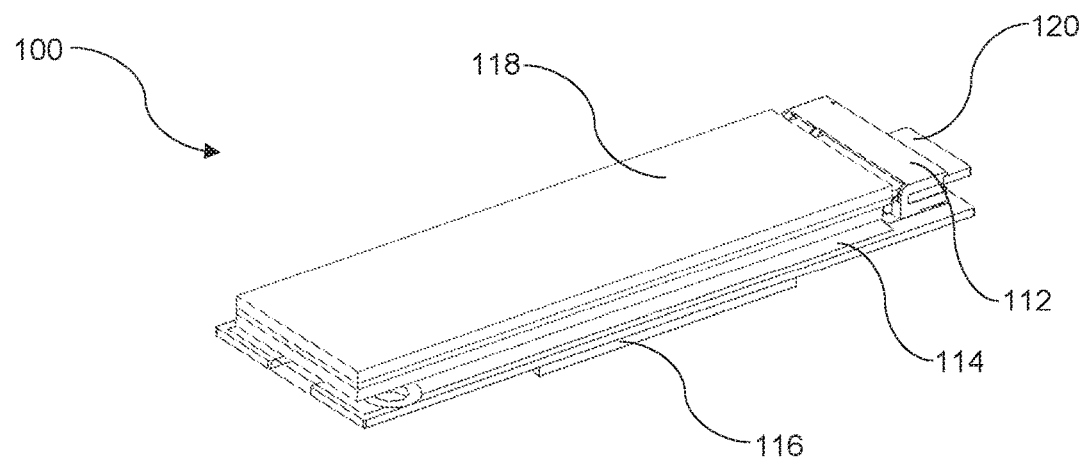
FIG. 1B is a perspective view of an example carrier module coupled to a storage drive.

Referring now to FIGS. 1A and 1B, an example carrier module is illustrated. The carrier module 100 may include a carrier board 114, the carrier board including a storage drive interface 112, an adapter connector 120, and a power storage component 116.

Carrier board 114 may structurally support and electrically connect multiple electronic components. The carrier board 114 may, in some implementations, electrically connect multiple electronic components with copper pathways. In further implementations, the carrier board 114 may be substantially made out of a non-conductive substrate with copper pathways etched onto the substrate. In some implementations, the non-conductive substrate may include silicone. In some implementations, the carrier board 114 might comprise a single-layer printed circuit board (PCB), or a multi-layer PCB in other implementations.

As illustrated, the carrier board 114 may include a storage drive interface 112 coupled to the carrier board 114. The storage drive interface 112 may be an electrical interface to communicate with an edge connector of a storage drive 118, the edge connector in communication with a memory portion of the storage drive 118. In some implementations, the storage drive interface 112 may communicate with multiple pins of the edge connector, and the multiple pins may include multiple signal pins, at least one power pin and at least one ground pin. In some implementations, the storage drive interface 112 may facilitate electrical communication between the multiple pins of the edge connector and the carrier board 114.

As seen in FIG. 1B, and discussed in further detail below, the carrier board 114 may receive and engage with the storage drive 118, the storage drive 118 electrically engaging with the carrier board 114 through the storage drive interface 112. The storage drive interface 112 may receive the storage drive 118 at an angle and allow the storage drive 118 to be tilted in a downward motion such that the storage drive interface 112 electrically engages with the multiple pins of the edge connector of the storage drive 118. In some implementations, the storage drive interface may be a M.2 storage drive interface to engage with a NGFF solid state storage drive, the carrier board 114 to receive a NGFF solid state storage drive. In yet further implementations, the NGFF solid state storage drive is a type 2280 NGFF solid state storage drive.

The carrier board 114 may further include an adapter connector 120 in electrical communication with the storage drive interface 112. The adapter connector may be an electrical interface to communicate with a receiving computer system. The adapter connector may be an edge connector including multiple pins. In some implementations, the adapter connector may include multiple signal pins, at least one power pin, and at least one ground pin. The multiple signal pins, the at least one power pin, and the at least one ground pin of the adapter connector may be in electrical communication with the storage drive interface 112, the storage drive interface 112 to electrically engage the multiple signal pins, the at least one power pin, and the at least one ground pin of the adapter connector with the multiple signal pins, the at least one power pin, and the at least one ground pin of the edge connector of the storage drive, respectively.

The carrier board 114 may removably engage with a complementary adapter receiver of the receiving computer system through the adapter connector 120. The signal pins and the power and ground pins of the adapter connector may engage with the adapter receiver such that they facilitate electrical communication between the adapter receiver and the adapter connector 120. The signal pins may transfer a signal from the receiving computer system to the carrier board 114 through the adapter receiver and the adapter connector 120. Further, the at least one power pin may receive a power input from the receiving computer system through the adapter receiver, and transfer the power input to the carrier board 114. In some implementations, the carrier board 114 further includes a regulator circuit to receive the power input from the at least one power pin of the adapter connector 120 and to decrease the voltage of the power input before providing the power input to the storage drive interface 112. In further implementations, the regulator circuit receives a 12 volt or a 5.5 volt power input from the at least one power pin of the adapter connector 120 and decreases the power input to 3.3 volts. Similarly, the at least one ground pin may electrically connect the carrier board to ground through the adapter receiver.

The adapter connector 120 may further include pins of different lengths. In some implementations of the present disclosure, the adapter connector 120 of the carrier board 114 may include at least one ground pin and at least one power pin that are longer than the signal pins, such that, when the adapter connector is interfacing with the adapter receiver, the at least one ground and power pins engage with the adapter receiver before the signal pins engage with the adapter receiver. Having at least one ground and power pin be longer than the signal pins, and, thus, engage with the adapter receiver before the signal pins, allows the storage drive engaged with the carrier board to be hot pluggable with the receiving computer system, including a server system. In some implementations, the adapter connector may be a male Mini Serial Attached SCSI (Mini SAS) connector, specifically, a 26-pin SFF-8086 Mini SAS connector. In yet further implementations, the adapter connector 120 may removably engage with a female Mini SAS connector.

In some implementations, the adapter connector may be physically disposed on the carrier board 114. Further, in some implementations, the adapter connector may be physically and electrically integrated with a PCB of the carrier board 114. In yet further implementations, the adapter connector 120 may be a separate element of the carrier module 100, and may not be part of the carrier board 114, however, the adapter connector 114 still in electrical communication with the storage drive interface 112.

The carrier board 114 may also include a power storage component 116, the power storage component 116 in electrical communication with the storage drive interface 112 and the adapter connector 120. In some implementations, the power storage component 116 may be physically disposed on the carrier board 114. The power storage component 116 may be an electrical component capable of storing power and providing the stored power to other electrical components so as to act as an energy source. In some implementations, the power storage component 116 may provide stored power to the other electrical components if the other electrical components experience a power loss. In some implementations, the power storage component 116 comprises at least one capacitor and/or super capacitor. In some implementations, the power storage component 116 comprises at least one capacitor and/or super capacitor with a rating of at least 1000 micro farads. In further implementations, the power storage component 116 comprises six capacitors, each with a rating of 15,000 micro farads.

The power storage component 116 may receive a power input from the adapter receiver through the adapter connector 120 and store the power input. In some implementations, the power storage component 116 may receive a power input from the receiving computer system through the adapter receiver and the at least one power pin of the adapter connector 120. The power storage component 116 may provide the stored power input to the storage drive 118 through the storage drive interface 112. In some implementations, the power storage component 116 may provide the stored power input to the storage drive 118 through the at least one power pin of the storage drive 118. In some implementations, the power storage component 116 may provide the stored power input to the storage drive 118 if the at least one power pin of the adapter connector 120 ceases to receive a power input from the adapter receiver. Further, the power storage component 116 may be used as the primary power source for the storage drive 118 and may provide the stored power input to the storage drive 118 in order to temporarily support a storage drive operation in the event that the at least one power pin of the adapter connector 120 stops receiving a power input from the adapter receiver. In some implementations, if the at least one power pin of the adapter connector 120 stops receiving a power input from the adapter receiver, the power storage component 116 may provide the stored power input to the storage drive 118 such that the storage drive 118 does not experience a loss of data stored in the storage drive 118. In some implementations, a storage drive operation may include flushing a cache of the memory portion of the storage drive 118 such that the storage drive 118 can be removed from power safely. The power storage component 116 may, therefore, provide enough power to the storage drive 118 for a long enough time such that the storage drive 118 can flush, or, permanently store the data found in the cache of the storage drive 118 in the memory portion of the storage drive 118 such that the data found in the cache of the storage drive 118 is not lost in the event that the adapter connector 120 stops receiving a power input from the adapter receiver. In some implementations, the power storage component 116 may be used as the primary power source for the storage drive 118 for between 10 and 30 seconds after the at least one power pin of the adapter connector 120 stops receiving a power input from the adapter receiver, the power storage component 116 to allow the cache of the storage drive 118 to be flushed and the storage drive 118 to be safely removed from all power such that the storage drive 118 does not experience a loss of data.

Figure 2A:
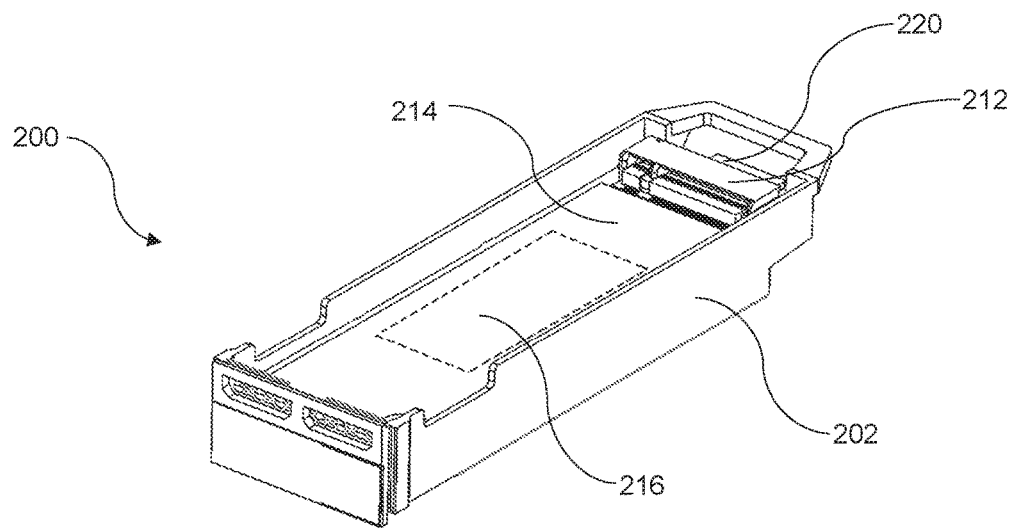
FIG. 2A is a perspective view of an example carrier module including a carrier housing.
Figure 2B:
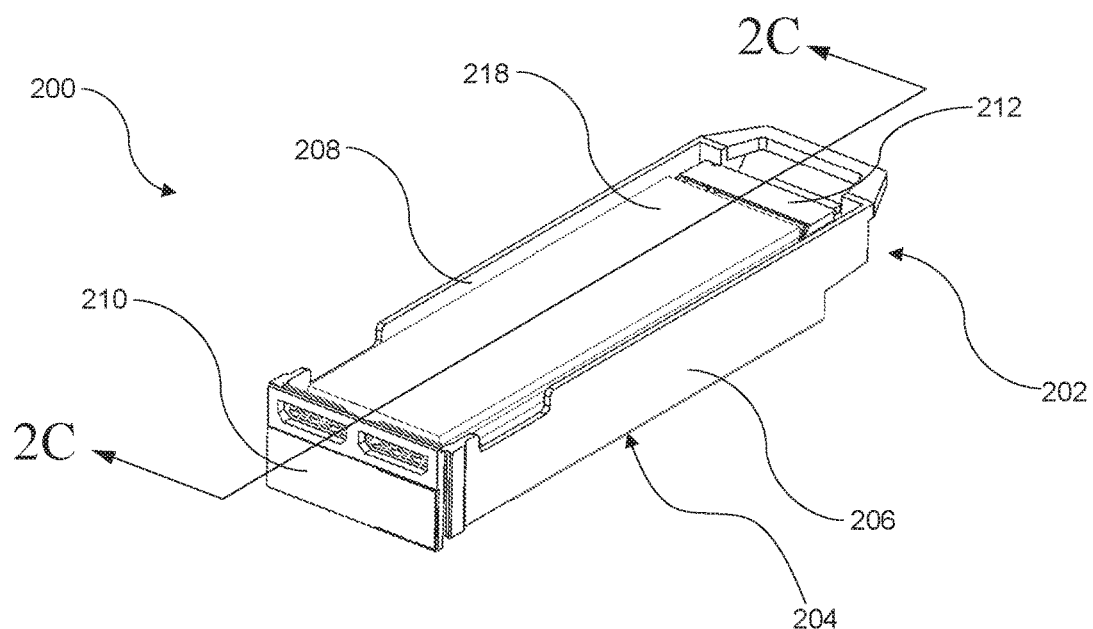
FIG. 2B is a perspective view of an example carrier module with a carrier housing, the carrier module coupled to a storage drive.
Figure 2C:
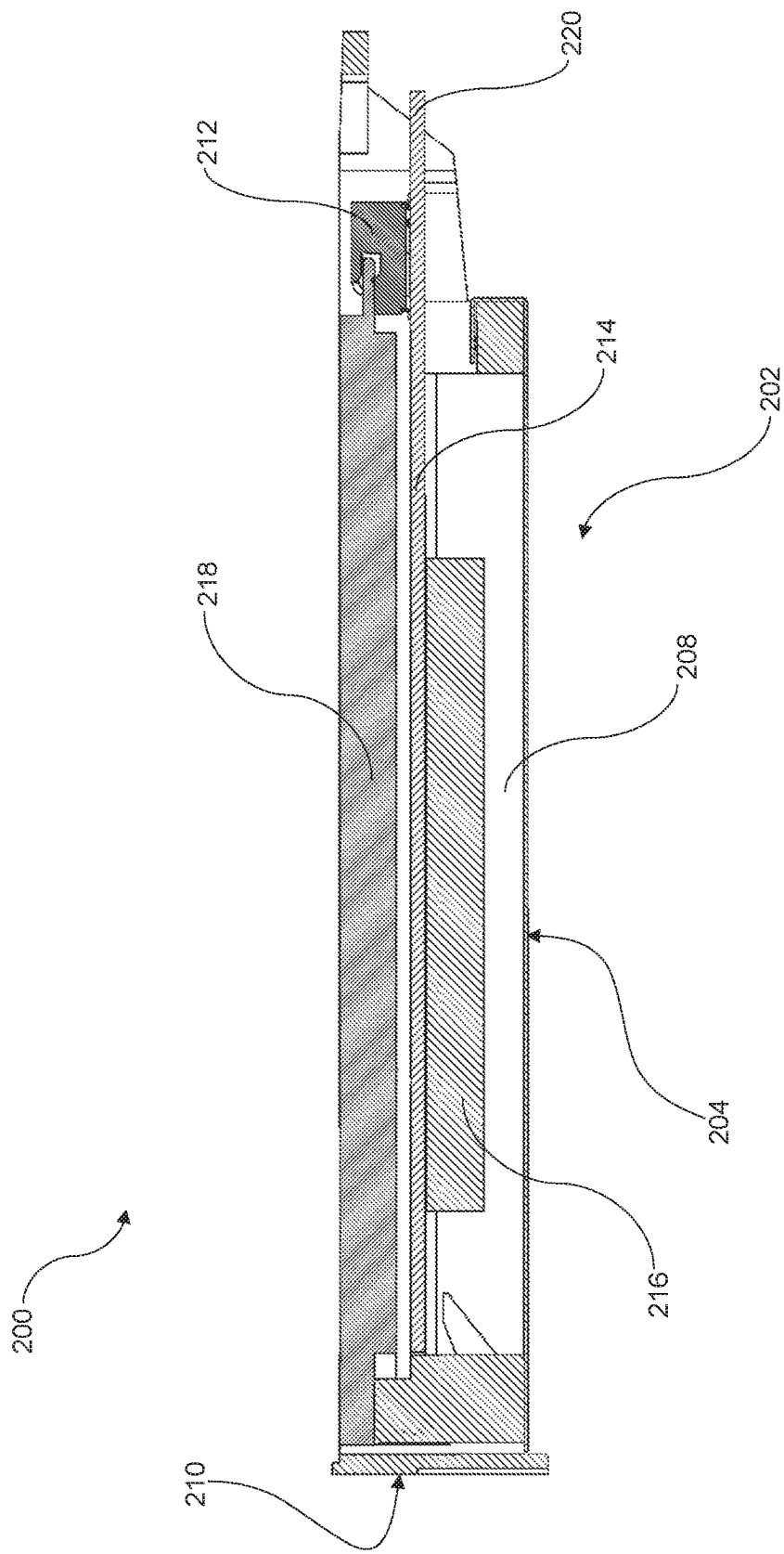
FIG. 2C is a sectional view of an example carrier module coupled to a storage drive, taken along cut line 2C of FIG. 2B.

Referring now to FIGS. 2A-C, a further implementation of the current disclosure is illustrated. A carrier module 200 may include a carrier board 214, the carrier board including a storage drive interface 212, an adapter connector 220, and a power storage component 216, as described above. Further, the carrier module 200 may include a carrier housing 202. The carrier housing may be a structural enclosure that substantially encompasses the elements of the carrier module 200. The carrier housing may protect the elements of the carrier module 200 from damage or mechanical or electrical interference with their function. In some implementations, the carrier housing 202 may protect the elements of the carrier module from static interference. In further implementations, the carrier housing 202 may facilitate removable insertion of the carrier module 200 into a receiving computer system, including a server system. In some implementations, the carrier housing 202 may facilitate the removable insertion of the carrier module 200 into a storage bay in the receiving computer system. In yet further implementations, the carrier housing 202 may facilitate direct insertion of the adapter connector 220 into a complementary adapter receiver within the storage bay of the receiving computer system.

The carrier housing 202 may receive and wholly or substantially enclose the carrier board 214, and may also removably receive a storage drive 218 while the storage drive 218 is electrically engaged with the storage drive interface 212, as illustrated in FIGS. 2B and C. FIG. 2C illustrates a cross-sectional view of the carrier module 200, as defined by cut-line 2C shown in FIG. 2B. The carrier housing 202 may further substantially enclose the storage drive 218 while the storage drive 218 is electrically engaged with the storage drive interface 212. In some implementations, the carrier housing 202 may receive a solid state storage drive 218. In further implementations, the carrier housing may receive and enclose a NGFF solid state storage drive 218 while the NGFF solid state storage drive 218 is electrically engaged with a M.2 storage drive interface 212 coupled to the carrier board 214. The carrier housing 202 may engage with the storage bay enclosing the adapter receiver in the receiving computer system such that the storage drive 218 is in electrical communication with the adapter receiver while the carrier housing 202 is engaged with the storage bay.

The carrier housing 202, in some implementations, may include a substantially flat bottom portion 204, a first side portion 206, a second side portion 208, and a front portion 210, as illustrated in FIGS. 2B and 2C. The first and second side portions 206 and 208, respectively, may be substantially flat, substantially parallel and opposite to each other, and substantially perpendicular to the bottom portion 204 and the front portion 210. Further, the front portion 210 may be substantially perpendicular to the bottom portion 204. In some implementations, the bottom portion 204, and the first and second side portions 206 and 208, respectively, may encourage the carrier module 200 to insert into the storage bay smoothly without the insertion of carrier module 200 being obstructed by other features within the storage bay.

Figure 3A:
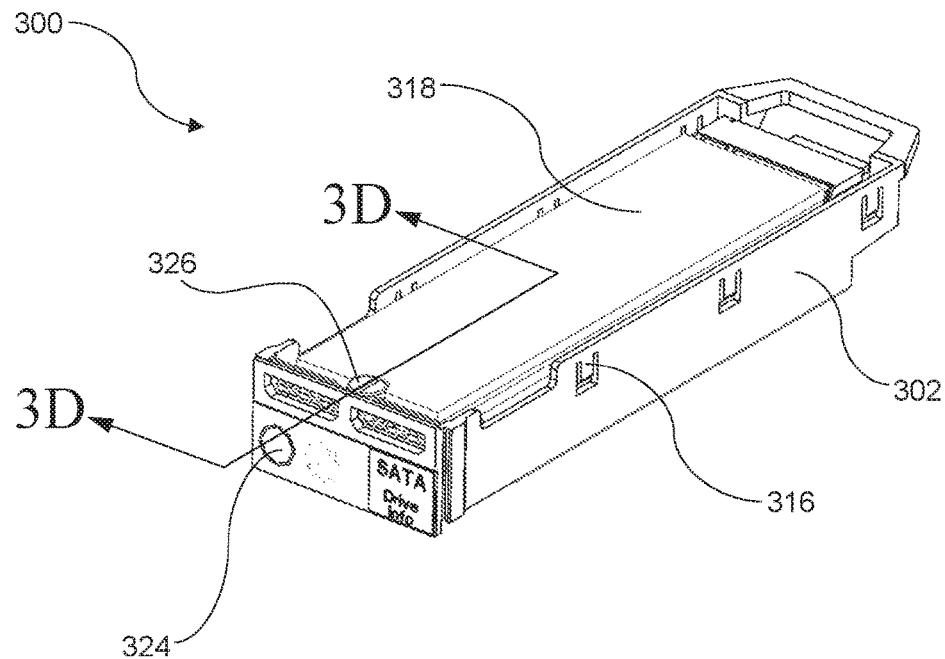
FIG. 3A is a perspective view of an example carrier module including a support portion, a user notification portion, carrier board retention features, and a storage drive retention feature, the carrier module coupled to a storage drive.
Figure 3B:
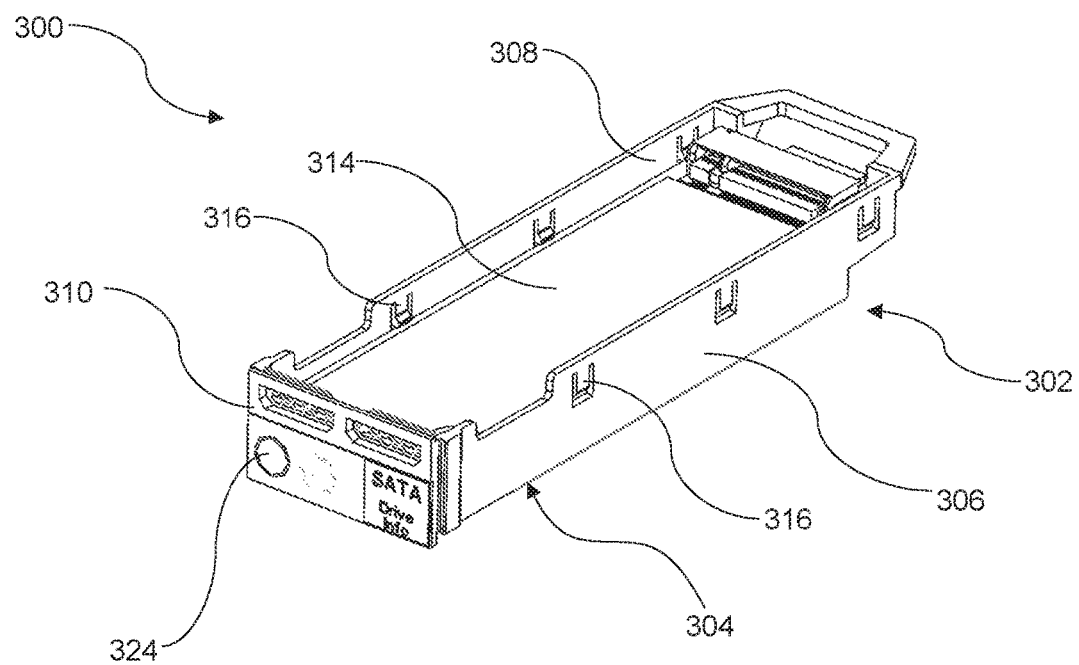
FIG. 3B is a perspective view of an example carrier module, the carrier module apart from a storage drive.
Figure 3C:
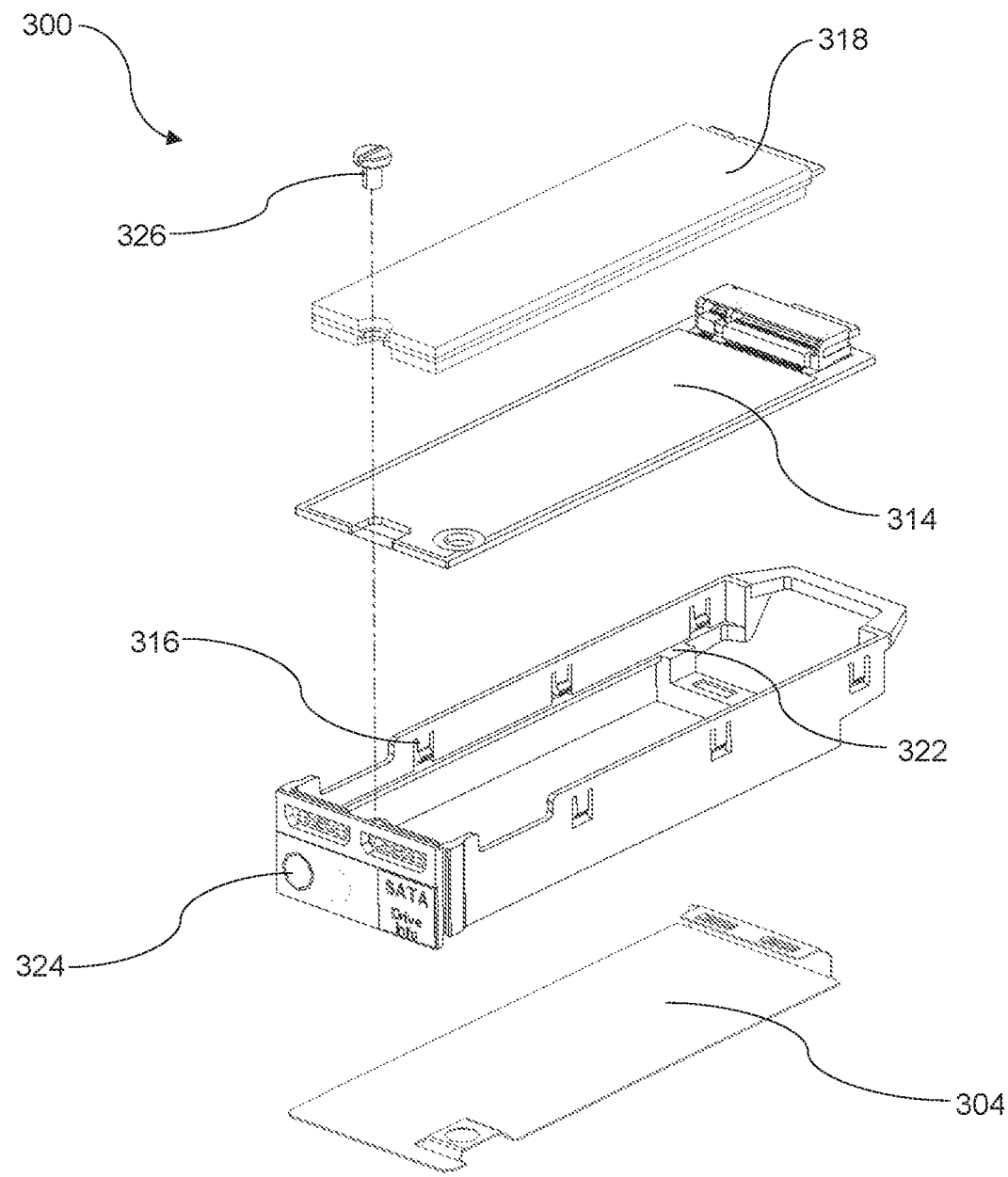
FIG. 3C is an exploded view of an example carrier module, the carrier module including a support portion, a user notification portion, carrier board retention features, and a storage drive retention feature.
Figure 3D:
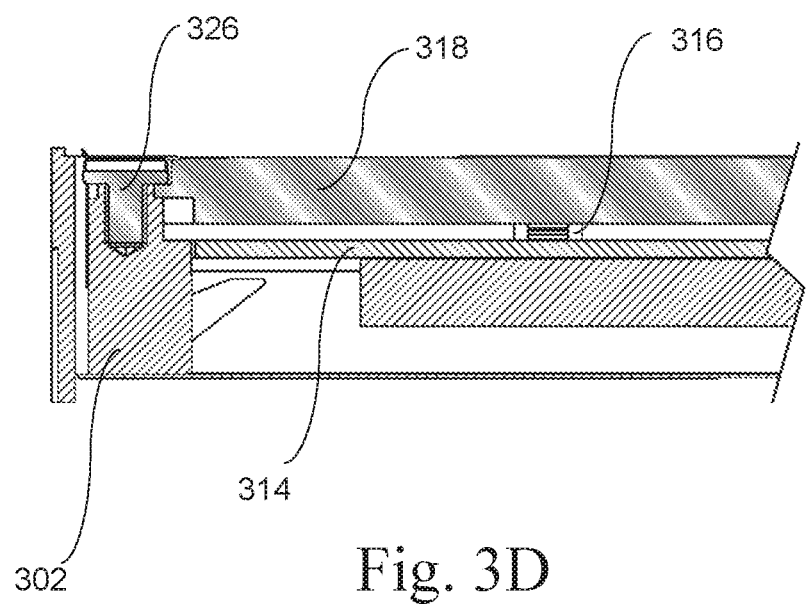
FIG. 3D is a partial sectional view of an example carrier module, taken along cut line 3D of FIG. 3A.

Referring now to FIGS. 3A-D. FIGS. 3A and 3B are perspective views of an implementation of a carrier module 300 to engage with a storage drive 318, the carrier module 300 including a carrier housing 302 and a carrier board 314, as described above. FIG. 3B is a perspective view of the implementation in FIG. 3A, illustrating the carrier module 300 while not engaged with the storage drive 318. FIG. 3C is an exploded perspective view of an implementation of the current disclosure, and FIG. 3D is a partial cross-sectional view of a further implementation of the current invention.

In some implementations, the carrier module 300 may further include support portions 322, retention features 316, a user notification portion 324, and/or a storage drive retention feature 326. It should be noted that, while the support portions 322, the retention features 316, the user notification portion 324, and the storage drive retention feature 326 are shown together in FIGS. 3A-D, implementations of the present disclosure do not need to include all of them.

In some implementations, a first and second side portion 306 and 308, respectively, of the carrier housing 302 may each include a support portion 322. The support portion 322 may be a feature that provides vertical support for the carrier board 314. Further, the support portion 322, in some implementations, may be a ledge or shelf, disposed on an inside surface of each of the first and second side portions 306 and 308, such that the support portion 322 on each side portion faces the other. Additionally, the support portion 322 on each side portion may be substantially parallel to a bottom portion 304 in order to provide support for the carrier board 314 such that the carrier board 314 is fixed substantially parallel to the bottom portion 304.

Additionally, some implementations of the present disclosure may include one or more retention features 316 disposed within the carrier housing 302. The one or more retention features 316 may be features that provide vertical support for the carrier board 314 such that the carrier board 314 is substantially fixed within the carrier housing 302. In some implementations, the retention features 316 may be disposed on each of the first and second side portions 306 and 308. The retention features 316 may be tabs or similar protrusions from the carrier housing 302. In some implementations, the retention features 316 are oriented above the support portion 322. In further implementations, the retention features 316 are oriented to urge the carrier board 314 against the support portions 322 on the side portions 306 and 308 such that the carrier board 314 is substantially fixed against the support portions 322.

Referring still to FIGS. 3A-3D, the carrier module 300 may further include, in some implementations, a user notification portion 322 on the exterior of the carrier housing 302. The user notification portion 322 may be an electric or mechanical feature to notify a user of a status or an activity of the carrier module 300 or the carrier board 314. In further implementations, the user notification portion 322 may be located on the front portion 310 of the carrier housing 302. In some implementations, the user notification portion 324 may include one or more light pipes or other features to transfer the visibility of one or more LEDs or other lights disposed on the receiving computer system to the front portion 310 of the carrier housing 302. In further implementations, the user notification portion 324 may include light emitting diodes (LEDs) on the exterior of the carrier housing 302 to notify the user of the status or activity of the carrier module 300 or the carrier board 314. The LEDs may be controlled by a controller or microcontroller on the carrier board 314, or by the receiving computer system The statuses or activities that the user notification portion 322 conveys may include, but are not limited to, one or more of a system or storage drive health, network or receiving computer system connection status of the storage drive 318, storage drive failure, whether the storage drive 318 is receiving power from the receiving computer system, or whether the storage drive is in a standby, an active, a reading, a writing or other mode.

Referring still to FIGS. 3A-3D, the carrier module 300 may yet further include a storage drive retention feature 326 disposed within the carrier housing 302. The storage drive retention feature 326 may be a feature to retain the storage drive 318 within the carrier housing 302 and in a position wherein the storage drive 318 is in electrical communication with the carrier board 314. In some implementations, and as illustrated in FIGS. 3C and 3D, the storage drive retention feature 326 may retain the storage drive 318 by being removably fixed or fastened to the carrier housing 302. In further implementations, the storage drive retention feature 326 may be a threaded fastener such as a screw or bolt. The threaded fastener may retain the storage drive 318 by engaging with a hole or cutout in the storage drive and threading into the carrier housing 302. In some implementations, the storage drive 318 may be a NGFF solid state storage drive and the retention feature 326 may be a threaded fastener that engages with a semicircular cutout in the NGFF solid state storage drive and further ends into the carrier housing 302.

What is claimed is:

1. A carrier module, comprising: a carrier board, the carrier board including: a storage drive interface; and an adapter connector in electrical communication with the storage drive interface, the adapter connector to engage with a complementary adapter receiver, the adapter connector including: a plurality of signal pins; a ground pin that is longer than the signal pins; and a power pin that is longer than the signal pins, wherein the plurality of signal pins, the ground pin, and the power pin are to engage with the complementary adapter receiver to facilitate electrical communication between the complementary adapter receiver and the adapter connector; and a power storage component in electrical communication with the storage drive interface and the adapter connector, the power storage component to store a power input from the complementary adapter receiver and to provide the power input to the storage drive interface to support a storage drive operation if the adapter connector ceases to receive a power input from the complementary adapter receiver.

2. The carrier module of claim 1, further including a carrier housing substantially enclosing the carrier board, the carrier housing to receive and to substantially enclose a storage drive and to engage with a storage bay enclosing the complementary adapter receiver, such that the storage drive is in electrical communication with the complementary adapter receiver when the carrier housing is engaged with the storage bay.

3. The carrier module of claim 2, wherein the carrier housing further includes a user notification portion disposed on an exterior of the carrier housing, the user notification portion to notify a user of a status or an activity of the carrier module.

4. The carrier module of claim 2, wherein the carrier housing includes a plurality of retention features to hold the carrier board in place within the carrier housing.

5. The carrier module of claim 4, wherein the carrier housing further includes a storage drive retention feature disposed within the carrier housing to retain the storage drive in a position wherein the storage drive is in electrical communication with the carrier board.

6. The carrier module of claim 1, wherein the storage drive interface is to removably engage with a solid state storage drive.

7. The carrier module of claim 1, wherein the adapter connector is a Mini Serial Attached SCSI (Mini SAS) interface.

8. A carrier module, comprising:
a carrier board, the carrier board including:
a storage drive interface to removably engage with a storage drive;
an adapter connector in electrical communication with the storage drive interface, the adapter connector to removably engage with a complementary adapter receiver, the adapter connector including:
a plurality of signal pins; and
a power pin that is longer than the signal pins, wherein the power pin is to engage with the complementary adapter receiver before the plurality of signal pins; and
a power storage component in electrical communication with the storage drive interface and the adapter connector, the power storage component to store a power input from the complementary adapter receiver and to provide the power input to the storage drive interface to support a storage drive operation if the adapter connector ceases to receive a power input from the complementary adapter receiver.

9. The carrier module of claim 8, further comprising a carrier housing substantially enclosing the carrier board, the carrier housing including:
- a substantially flat bottom portion;
- a first side portion;
- a second side portion,
- wherein the first and second side portions are disposed substantially perpendicularly to the bottom portion and disposed substantially parallel and substantially opposite to each other; and
- a front portion disposed substantially perpendicularly to each of the first and second side portions and to the bottom portion.

10. The carrier module of claim 9, wherein the first and second side portions each include a support portion disposed substantially parallel to the bottom portion, each support portion to provide support for the carrier board such that the carrier board is fixed substantially parallel to the bottom portion.

11. The carrier module of claim 9, wherein the first and second side portions each include at least one retention feature engaged with the carrier board to urge the carrier board against the support portions of the first and second side portions.

12. The carrier module of claim 9, wherein the carrier housing further includes a user notification portion disposed on the front portion, the user notification portion to notify a user of a status or an activity of the carrier module.

13. The carrier module of claim 8, wherein the storage drive is a Next Generation Form Factor (NGFF) solid state storage drive, and wherein the storage drive interface is a M.2 storage drive interface.

14. A carrier module, comprising: a carrier board in electrical communication with a solid state storage drive, the carrier board including: a storage drive interface coupled to the carrier board and to receive the solid state storage drive; a power storage component, wherein the power storage component is to provide power to the solid state storage drive through the storage drive interface to support a storage drive operation; and an adapter connector in electrical communication with the carrier board and to removably engage with and receive a power input from a complementary adapter receiver, the adapter connector to provide the power input to the power storage component, wherein the power storage component is to provide the stored power input to the solid state storage drive if the adapter connector ceases to receive the power input from the complementary adapter receiver such that the solid state drive can flush a cache on the solid state drive so as to not experience a loss of data in the cache; the adapter connector includes a plurality of signal pins, a ground pin that is longer than the signal pins, and a power pin that is longer than the signal pins.

15. The carrier module of claim 14, wherein the power storage component includes at least one capacitor, the capacitor having a rating of at least 1000 micro farads.

16. The carrier module of claim 14, wherein the solid state storage drive is a Next Generation Form Factor (NGFF) solid state storage drive, and wherein the storage drive interface is a M.2 storage drive interface.

17. The carrier module of claim 14, wherein the plurality of signal pins, the ground pin, and the power pin are to engage with the complementary adapter receiver to facilitate electrical communication between the complementary adapter receiver and the adapter connector.

18. The carrier module of claim 14, wherein the storage drive interface is to removably engage with the solid state storage drive.

19. The carrier module of claim 14, wherein the adapter connector is a Mini Serial Attached SCSI (Mini SAS) interface.

* * * * *